June 9, 1936.   H. LINDNER   2,043,625
ADJUSTMENT OF THE CARRIAGE OF MACHINE TOOLS
Filed Feb. 8, 1935   2 Sheets-Sheet 1

Inventor:
Herbert Lindner.
By Franks Appleman
atty.

June 9, 1936.  H. LINDNER  2,043,625
ADJUSTMENT OF THE CARRIAGE OF MACHINE TOOLS
Filed Feb. 8, 1935  2 Sheets-Sheet 2
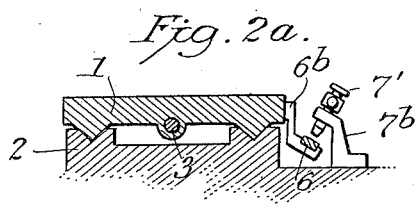
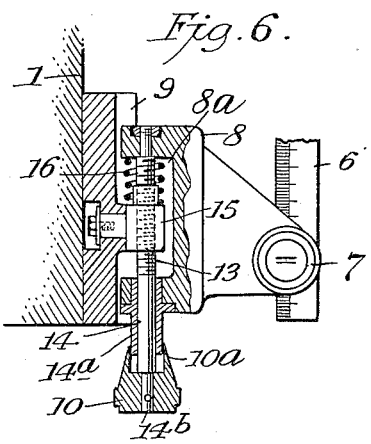
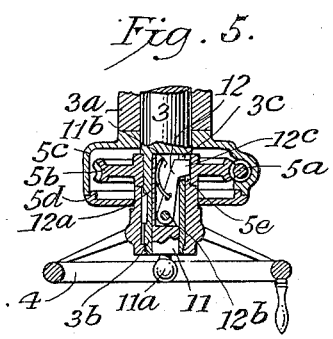
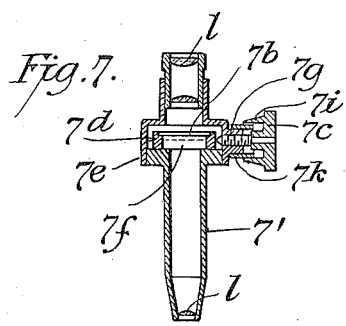
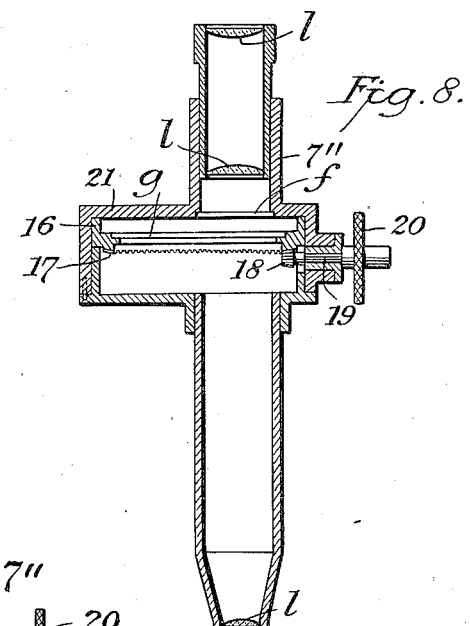
INVENTOR,
Herbert Lindner,
BY
Franks Appleman,
ATTORNEY.

Patented June 9, 1936

2,043,625

UNITED STATES PATENT OFFICE 2,043,625

ADJUSTMENT OF THE CARRIAGE OF MACHINE TOOLS

Herbert Lindner, Berlin, Germany

Application February 8, 1935, Serial No. 5,680
In Germany May 12, 1934

5 Claims. (Cl. 33—181)

This invention relates to the adjustment of the rectilinear movement of the carriages of machine tools such as jig boring machines of the kind in which this adjustment is effected by means of an optical device arranged to cooperate with a longitudinal scale and has for its object to provide an improved method of effecting the required adjustment.

According to the principal feature of the invention the fine adjustment corresponding to the smallest fractional portion of the distance through which the carriage is to be displaced is effected by directly or indirectly adjusting the reading or indication line or mark of the optical device to the required fractional distance and then displacing the carriage, until a division line or graduation on the scale coincides with the line or mark on the optical device.

In carrying into practice the method above described a known form of optical device may be employed having a reading plate adapted to be axially displaced by a micrometer device or another known form of optical device may be utilized having a fixed reading plate and a rotatable reading plate cooperating therewith, the latter bearing a flat spiral line the pitch of which is such that a complete rotation of the plate corresponds to a single scale subdivision and is circularly graduated so as to indicate the smallest required fractional parts thereof.

According to a further feature of the invention the optical device as a whole is arranged to be axially displaceable relative to the scale by means of a fine adjustment device.

As regards the optical devices above referred to, the first has hitherto only been employed as a precision measurement device for testing the cumulative inaccuracies of lead screw spindles, whilst the other optical device has been utilized for testing the accuracy of subdivision of subdividing apparatus. The novel application of these devices to the method of the invention gives the advantage that the accuracy of adjustment of the carriage no longer depends upon the wear or torsional stresses and strains to which the adjusting screw threaded spindle is subjected, the fine adjustment of the carriage being now effected by means of a sliding member which is almost entirely free from mechanical stress.

Figure 2:
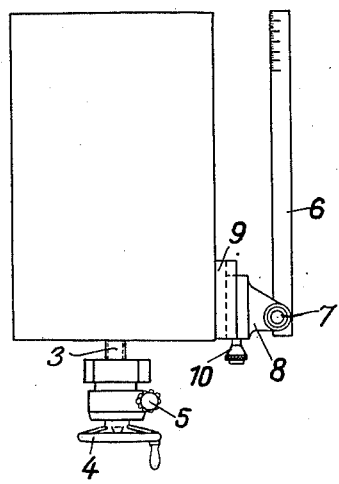
Figure 2 is a diagrammatic plan view of the arrangement shown in Figure 1.

Fig. 2ª is a diagrammatic cross section through the machine but using a second form of the invention.

Figure 3:
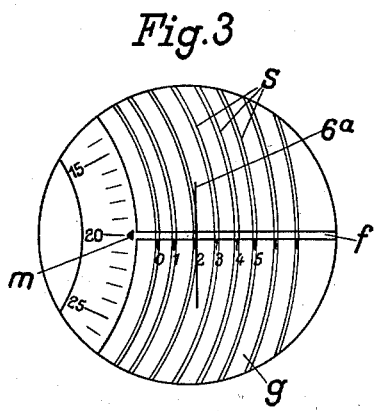

Figure 3 is a view of one form of the optical field as seen through a microscope used herewith.

Figure 4:
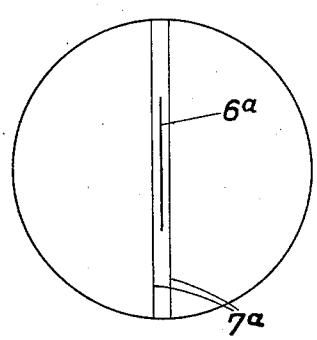

Figure 4 is a view similar to Figure 3 but showing the optical field of a different arrangement of the invention.

Figure 5 is a detail section through the carriage adjusting means for fast and slow feed used herewith.

Figure 6 is a detail section showing the micrometric adjustment for the microscope used herewith.

Figure 7 is a vertical section through the form of microscope producing the field shown in Figure 4.

Figure 8 is a view similar to Figure 7 but showing the microscope arranged to produce the field shown in Figure 3.

Figure 9 is a plan view of the device shown in Figure 8.

Referring now to the drawings it will be seen that the carriage 1 of the machine tool is adapted to be rectilinearly displaced in guides formed on the bed 2 of the machine. This displacement is effected by means of a screw threaded spindle 3 provided with a hand wheel 4 for coarse adjustment and a hand wheel 5 for fine adjustment, a longitudinal scale 6 being mounted on the bed 2 adjacent and parallel to the carriage 1. A microscope indicated diagrammatically at 7 is provided for reading the scale graduations and is carried by a supporting arm 8 which is mounted in a guide member 9 secured to the carriage 1 in such a manner as to be capable of being axially displaced in the guide member 9. This axial displacement of the arm 8 is effected by a micrometer device 10 which is adapted to read hundredths and thousandths of a millimetre, the device 10 comprising for instance a screw threaded spindle for effecting the displacement of the arm 8 and provided with a graduated head and vernier.

The optical device may as shown be mounted on the carriage 1 and the scale 6 mounted on the bed of the machine or conversely the scale may be secured to the carriage and the optical device to the bed as in Figure 2ª. In this form the scale 6 is fixed to the carriage 1 in a bracket 6b. The microscope 7' is mounted on a holder 7b micrometrically movable along the bed 2 of the machine. Any suitable form of longitudinal scale may be employed such for instance as a scale provided with the ordinary straight division lines or graduations or a cylindrical scale the surface of which bears a fine helical subdivision line of suitable pitch.

The means for selectively effecting a coarse and fine adjustment of the carriage on its bed is illustrated in detail in Figure 5. As here shown, the screw 3 has a journal portion supported in a fixed bearing 3a to which is fixed a casing 5c having a cover 5d. On the screw 3 is a tubular extension 3c which projects through the casing cover and has the hand wheel 4 keyed upon it. Journalled in the casing is a worm 5a which is operated by the hand wheel 5 and meshes with a worm gear 5b mounted on the tubular extension. This gear 5b may be coupled to or uncoupled from the screw 3 at will and to this end the gear 5b is provided in its hub with a keyway 5e. The extension 3b is provided with a slot 3c. Slidable in the extension 3b is a plug or plunger 11 having an operating knob 11a by means of which it may be moved inwardly and outwardly of the extension 3b. This plunger has a slot 11b wherein an arm 12 is mounted on a pivot 12b. This arm 12 is provided with a nose 12c which may be moved into and out of engagement with the keyway 5e through the slot 3c, the nose being urged outwardly by the spring 12a. This nose is so shaped that pulling the plunger outwardly causes the nose to move inwardly against the action of the spring. Thus, when it is desired to effect coarse adjustment of the carriage, the worm gear is disconnected by pulling the plunger outwardly so that the hand wheel 4 can be used to rotate the screw 3 but, when fine adjustment is desired, the worm gear is coupled to the extension 3b by moving the plunger in and the adjustment is effected by turning the hand wheel 5.

Figure 1:
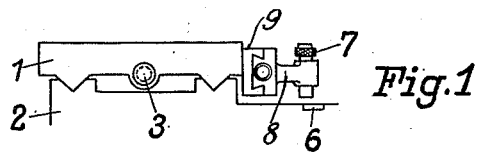
Figure 1 is a diagrammatic cross section through a machine provided with one form of the invention.

The micrometer arrangement for moving the microscope in the form shown in Figures 1 and 2 is shown in detail in Figure 6, wherein the guide 9 is shown as having a nut 15 fixed thereon, the arm or bracket 8 being provided with a recess 8a to receive said nut. A micrometer screw 13 is journalled at one end in the bracket 8 while it is provided with a journal portion 14 at its other end. Fitted in the bracket 8 is a sleeve 14a wherein is journalled the portion 14. A head 10 is fixed on a reduced end 14b of the micrometer screw and this head has a skirt 10a which fits over the sleeve 14a. The sleeve 14a and skirt 10a are provided with the customary micrometer graduations (not shown).

Assuming for example that the carriage 1 is to be displaced through a distance of 324.725 mm. The carriage is first set into an initial position relative to the scale 6 by rotating the micrometer head 10 so that the reading lines in the field of vision of the microscope 7 which may as shown in Figure 4 consist of two parallel lines 7a spaced so that between them may lie a division line 6a on the scale 6. The carriage 1 is then displaced through a distance of 324 mm. on the scale 6 by rotating the spindle 3. The microscope 7 is then moved displacing the arm 8 in its guide member 9 by means of the micrometer head 10 in the backward direction through a distance equal to 0.725 mm. as read on the micrometer and finally the carriage 1 is moved further by means of the spindle 3 until the lines 7a on the microscope 7 again register with the line 6a on the scale.

In the case in which the scale 6 is mounted on the carriage 1 and the microscope is mounted on the stationary bed of the machine it will be evident that the microscope must be displaced through a distance of 0.725 mm. in the forward direction in order to give a total displacement of the carriage of 324.725 mm.

In an alternative arrangement the microscope supporting arm 8 can be rigidly secured to the carriage 1, an axially displaceable reading plate for the microscope being provided. The adjustment is effected in a similar manner to that above described except that instead of the microscope as a whole being displaced, the reading plate only is moved over the fractional portion of the distance required. A microscope arranged for this purpose is shown in Figures 7 and 2a. In this form the microscope 7' is provided intermediate its ends with an enlarged portion forming a casing 7e wherein is mounted a slide 7d having a central opening 7f covered by a glass plate 7b, the index lines 7a being inscribed on this plate in the manner shown in Figure 4 for the form having a fixed plate. Extending through one side of the casing 7e is a micrometer screw 7g having an operating head 7c. This head has a skirt 7i which fits over a sleeve 7k carried by the casing, the skirt and sleeve being provided with the usual micrometer graduations (not shown). The screw 7g bears against the slide 7f to move it as the head 7c is turned. In a still further form of the invention there is provided a microscope 7" having a casing 21 eccentrically disposed between its ends. In the upper end of this casing there is revolubly fitted a ring 16 having an annular beveled gear 17 formed on its lower side. Through one side of the casing extends a short shaft 19 having a knurled operating head 20 fixed to its outer end. On the inner end of the shaft 19 is fixed a beveled pinion 18 which meshes with the gear 17 so that movement of the head 20 causes rotation of the ring 16. In the ring 16 is fixed a glass plate g and a glass plate f is fixed in the microscope tube above the plate g. As shown in the field of vision of the microscope of Figure 3, the fixed reading plate f is provided bearing parallel graduations 0 to 5 and a reading mark m the rotatable reading plate g being arranged to cooperate with the reading plate f. The plate g is provided with a circular graduation scale which is subdivided for 0.01–0.001 mm. This curved graduation corresponds to the pitch of a flat spiral s indicated on the reading plate g.

Assume, for instance, that the carriage 1 is to be displaced through a distance of 525.125 mm. and that the microscope 7 is mounted on the bed of the machine, the scale 6 being secured to the carriage 1.

The division line on the scale is first brought to register with the reading mark m on the fixed reading plate f and the reading plate g is rotated to bring the spiral line over this reading mark. The carriage 1 is then displaced through 525 mm. which will have been correctly effected when the division line 525 on the scale lies on the first spiral line on the reading plate g.

The reading plate g is now rotated until the first spiral line has moved over the reading mark 1 on the fixed reading plate f and the mark m on the circular scale is opposite the value 0.025. Under these conditions the carriage 1 is now moved further until the division line on the scale again registers with the first spiral line on the plate g, whereupon the carriage will have been correctly adjusted with the greatest accuracy to the distance 525.125.

I claim:

1. In combination, a pair of machine tool elements one of which is slidably mounted on the other, means for effecting adjustment of the slidable element on the other element, a scale carried by one of said elements, a microscope carried by the other element and including index means, said microscope including the scale in its field, and micrometric means associated with the microscope for shifting the index means micrometrically over the scale.

2. In combination, a pair of machine tool elements one of which is slidably mounted on the other, means for effecting adjustment of the slidable element on the other element, a scale carried by one of said elements, a microscope carried by the other element and including index means, said microscope including the scale in its field, and micrometric means for shifting the relative positions of the scale and index means.

3. In combination, a pair of machine tool elements one of which is slidably mounted on the other, means for effecting adjustment of the slidable element on the other element, a scale carried by one of said elements, a microscope carried by the other element and including index means, said microscope including the scale in its field, and micrometric means for shifting said microscope and its index means bodily along the element by which it is carried.

4. In combination, a pair of machine tool elements one of which is slidably mounted on the other, means for effecting adjustment of the slidable element on the other element, a scale carried by one of said elements, a microscope carried by the other element and including index means, said microscope including the scale in its field, means in the microscope to support the index means for movement in the field of the microscope, and micrometric means operable from the exterior of the microscope to move the index supporting means.

5. In combination, a pair of machine tool elements one of which is slidably mounted on the other, means for effecting adjustment of the slidable element on the other element, a scale carried by one of said elements, a microscope carried by the other element and including index means, said microscope including the scale in its field, a transparent rotatable disk carried by the microscope eccentric to the line of collimation of the microscope and having micrometric divisions thereon, and means exterior to the microscope to rotate said disk.

HERBERT LINDNER.